United States Patent [19]

Rasshofer et al.

[11] 4,418,159

[45] Nov. 29, 1983

[54] PROCESS FOR THE PRODUCTION OF POLYURETHANES AND A STORABLE INTERMEDIATE PRODUCT FOR CARRYING OUT THIS PROCESS

[75] Inventors: Werner Rasshofer; Richard Kopp, both of Cologne; Reiner Paul, Muehlheim, all of Fed. Rep. of Germany

[73] Assignee: Bayer Aktiengesellschaft, Leverkusen, Fed. Rep. of Germany

[21] Appl. No.: 433,198

[22] Filed: Oct. 7, 1982

[30] Foreign Application Priority Data

Oct. 16, 1981 [DE] Fed. Rep. of Germany ....... 3141117

[51] Int. Cl.³ ............................................. C08G 18/14
[52] U.S. Cl. ....................................... 521/121; 528/58; 502/170; 502/150
[58] Field of Search ....................... 252/431 R, 431 C; 521/121; 528/58

[56] References Cited

U.S. PATENT DOCUMENTS

| | | | |
|---|---|---|---|
| 3,476,704 | 11/1969 | Schroeder et al. | 260/45.75 |
| 3,709,918 | 1/1973 | Stapfer | 252/431 R |
| 3,975,317 | 8/1976 | Russo | 521/121 |
| 4,136,046 | 1/1979 | Hirshman et al. | 252/182 |

FOREIGN PATENT DOCUMENTS 1411370 8/1965 France .

*Primary Examiner*—Maurice J. Welsh
*Attorney, Agent, or Firm*—Gene Harsh; Joseph C. Gil; Richard A. Elder

[57] ABSTRACT

Optionally-foamed polyurethanes are produced by reacting polyisocyanates with organic compounds containing at least two isocyanate-reactive hydrogen atoms and having a molecular weight in the range from 400 to 10,000, in the presence of activators corresponding to the general formula

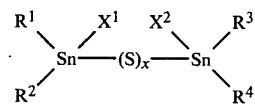

wherein
$R^1$, $R^2$, $R^3$ and $R^4$ may be the same or different and represent $C_1$-$C_{20}$-alkyl, $C_5$-$C_7$-cycloalkyl, $C_6$-$C_{14}$-aryl or $C_7$-$C_{30}$-alkaryl,
$X^1$ and $X^2$ may be the same or different and represent halogen or a radical of the formula $-OR^5$, $-SR^6$ or

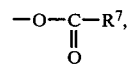

with the proviso that $X^1$ and $X^2$ cannot both represent a halogen atom,
$R^5$, $R^6$ and $R^7$ may be the same or different and represent a $C_1$-$C_{20}$-alkyl, $C_5$-$C_7$-cycloalkyl, $C_6$-$C_{14}$-aryl or $C_7$-$C_{30}$-alkaryl and $1 \leq x \leq 4$,
and, optionally, in the presence of co-catalysts, blowing agents, chain-extending agents having a molecular weight of from 32 to 400 and other known auxiliaries and additives.

10 Claims, No Drawings

PROCESS FOR THE PRODUCTION OF POLYURETHANES AND A STORABLE INTERMEDIATE PRODUCT FOR CARRYING OUT THIS PROCESS

This invention relates to an improved process for the production of polyurethanes and to a storable intermediate product for the production of polyurethanes.

BACKGROUND OF THE INVENTION

The polyurethane-forming polyaddition reaction between polyhydroxyl compounds and polyisocyanates, particularly aliphatic and alicyclic polyisocyanates, normally involves a two-component system. One of the components consists of a polyfunctional isocyanate. The second component contains a polyol, optionally a blowing agent together with further modifying agents and additives, and suitable catalysis to obtain a reaction between components which is fast enough for industrial purposes. This second component is normally used in the form of a prepared mixture by the processor, i.e., it is prepared weeks or months before processing.

It is known that both divalent and also tetravalent tin compounds, divalent lead and trivalent bismuth compounds are effective catalysts for the isocyanate addition reaction. It is further known that activator combinations of metal compounds and amine-containing catalysts selected from, for example, tertiary amines or amidines, such as triethyl amine, triethylene diamine (diazabicyclooctane or "Dabco ®") or diazabicycloundecene (DBU), or other non-amine catalysts, for example, basic catalysts, may also be used for this purpose. Examples of the metal compounds used include the bis-carboxylates of dialkyl tin compounds, such as di-(n-butyl)-tin dilaurate, or the bis-mercaptides of dialkyl tin compounds, such as dimethyl tin bis-(laurylmercaptide), metal acetyl acetonates, such as Fe(II) acetyl acetonate, Fe(III) acetyl acetonate, dibutyl tin acetyl acetonate and lead (II) acetyl acetonate and other lead compounds, such as lead di-(2-ethylhexanoate), or bismuth compounds, such as, for example, bismuth tri-(2-ethylhexanoate).

Some of the most preferred catalysts include tin II) bis-(2-ethylhexanoate), dibutyl tin di-(laurylmercaptide), dibutyl tin di-laurate (DBTL), dialkyl tin di-(thioglycolic acid esters), such as, for example, M&T-C 131, lead(II) di-(2-ethylhexanoate), lead (II) dinaphthenate and bismuth tri-(2-ethylhexanoate) or bismuth tri-(thiododecyl). Unfortunately, these catalysts, like most other members of these classes of tin, lead and bismuth compounds, undergo a considerable loss of activity when incorporated in a polyol mixture containing one or more short-to-long-chain, linear or branched, polyols, optionally in admixture with other compounds containing NCO-reactive groups (such as, for example, polyamines), blowing agents, additives such as cell stabilizers, heat and light stabilizers and non-metallic co-catalysts.

This loss of activity involves disadvantages from the point of view of practical application.

German Offenlegungsschrift No. 2,722,658 proposes, as storable tin gel catalysts, compounds corresponding to the following general formulae, $R_2Sn(SCN)_2$, $[R_2Sn(SCN)]_2O$, $[R_2Sn(SCN)]_2S$, $(R_2SnX)_2S$ and $R_2SnS$, wherein R represents a hydrocarbon and X represents chlorine, bromine or iodine. The disadvantages of these compounds, however, include their poor solubility and their low activity which makes them unsuitable for most polyurethane plastics. In this reference, these catalysts are used in quantities of from 0.1 to 10 parts, by weight, per 100 g of polyol, the lower limit of this range actually lying above the concentration in which the tin catalysts are normally used.

The object of the present invention is to provide a new, storable mixture of polyol and metal catalysts, which catalysts are stable in their activity and which, in addition, are intended to be readily soluble in the polyol component. Another object of the present invention is to provide a process for the production of polyurethanes using these catalysts.

Surprisingly, these objects could be achieved by using tin compounds corresponding to the following general formula as the metal catalysts.

DESCRIPTION OF THE INVENTION

The present invention relates to a process for the production of optionally-foamed polyurethanes by reacting polyisocyanates with organic compounds containing at least two isocyanate-reactive hydrogen atoms and having molecular weights in the range of from 400 to 10,000, in the presence of activators and, optionally, in the presence of blowing agents and chain-extending agents having a molecular weight of from 32 to 400, and other known auxiliaries and additives, characterized in that the activators used are compounds corresponding to the general formula:

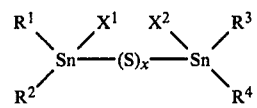

wherein
$R^1$, $R^2$, $R^3$ and $R^4$ may be the same or different and represent $C_1$–$C_{20}$-alkyl, $C_5$–$C_7$-cycloalkyl, $C_6$–$C_{14}$-aryl or $C_7$–$C_{30}$-alkaryl;
$X^1$ and $X^2$ may be the same or different and represent halogen or a radical of the formula —$OR^5$, —$SR^6$ or

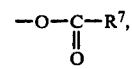

with the proviso that $X^1$ and $X^2$ may not both represent a halogen atom;
$R^5$, $R^6$ and $R^7$ may be the same or different and represent $C_1$–$C_{20}$-alkyl, $C_5$–$C_7$-cycloalkyl, $C_6$–$C_{14}$-aryl or $C_7$–$C_{30}$-alkaryl and $1 \leq x \leq 4$.

According to the invention, $R^1$ and $R^2$, as well as $R^3$ and $R^4$ in the general formula are preferably the same, and the halogen atom in the definition of $X^1$ and $X^2$ is preferably a chlorine atom. In addition, $R^1$ through $R^4$ preferably represents $C_1$–$C_{12}$-alkyl radicals, while $R^5$ through $R^7$ preferably represents $C_1$–$C_{20}$-alkyl radicals.

In general, the activators corresponding to the above general formula are used in a quantity of from 0.005–1 to 1% by weight, and preferably in a quantity of from 0.01–0.5% by weight, based on the compounds containing at least 2 active hydrogen atoms and having molecular weights in the range of from 400 to 10,000.

The tin compounds corresponding to the above general formula are distinguished by the fact that they do not lose their activity, even in the presence of water and amine-containing co-catalysts, amidine-containing co-catalysts or other co-catalysts, such as basic co-catalysts. Water may be present in a quantity corresponding to a multiple molar excess and also to an excess by weight, based on the tin compound.

The present invention also relates to a storable intermediate product for carrying out the process according to the invention, which is characterized in that it contains (a) an organic compound containing at least two isocyanate-reactive hydrogen atoms and having a molecular weight of from 400 to 10,000, and (b) a catalytically-active quantity of an activator corresponding to the general formula:

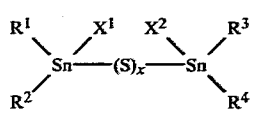

wherein $R^1$ through $R^4$, $X^1$, $X^2$ and x are as defined above.

A preferred storable intermediate product of the type described additionally contains (a) a catalytic quantity of a metallic or non-metallic co-catalyst and, optionally, (b) a chain-extending agent having a molecular weight of from 32 to 400, (c) a blowing agent, (d) a cell stabilizer and, (e) other known auxiliaries and additives.

In one preferred embodiment of the process according to the invention, the polyisocyanate is reacted with an intermediate product of the type described above. Finally, the process according to the invention is preferably used for the production of foam moldings having an impervious outer skin, and a foam core having a decreasing density of which the minimum lies substantially in the middle of the mold parting cross-section (i.e., integral-skin foams).

Apart from the fact that stable catalysts giving solutions of constant activity are now available, the use of catalysts in accordance with the invention affords the additional advantages:

(1) Two-optionally differently-substituted tin atoms are present alongside one another in the catalysts used in accordance with the invention. Since, as experience in the field has shown, differently-substituted tin atoms differ in their catalytic activity, catalytic activity may be "finely tuned" through suitable substitution of the tin atoms.

(2) The catalysts show considerably better solubility in short-chain and long-chain polyols by comparison with the tin compounds according to German Offenlegungsschrift No. 2,722,658.

(3) The catalysts according to the invention do not show any tendency to precipitate or crystallize out, even at low temperatures.

(4) The catalysts according to the invention may be successfully used without amine-containing, amidine-containing or other co-catalysts.

(5) Integral skin foams produced using the catalysts according to the invention show a distinctly reduced tendency to develop blisters and surface faults coupled with improved skin formation.

The activators used in accordance with the invention, which, in general, are so-called distanthians, are known.

They are produced, for example, in accordance with the reaction equations:

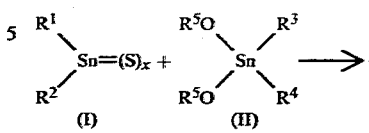

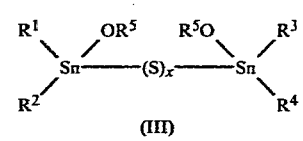

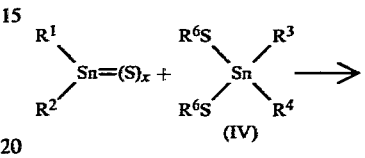

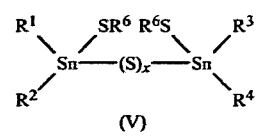

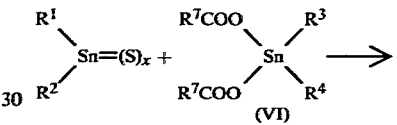

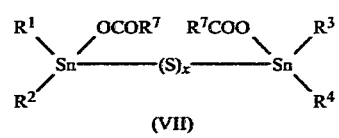

Dialkyl tin (poly)sulfides may be obtained, for example, by reacting dialkyl tin chlorides with hydrogen sulfide and an auxiliary base, or by reacting dialkyl tin chlorides with alkali (poly)sulfides. Instead of using dialkyl tin compounds, it is also possible to use dicycloalkyl or diaryl compounds. The tin sulfides probably do not exist in monomeric form, but rather in the form of cyclic adducts (cf., T. Harada, Bull. Chem. Soc. Jap., 17,283 (1942)). Examples of compounds corresponding to general Formulae (III) and (VII) are given by A. G. Davies and P. G. Harrison, in J. Organometal Chem. 8, P 19 (1967).

Compounds corresponding to Formula (II) are obtained, for example, by reacting the corresponding tin oxides with alkanols, cycloalkanols, phenols and the like, with separation of water, and also by reacting the tin dihalides with alkali salts of the corresponding alkanols, and the like or by reaction with alkanols and the like in the presence of an auxiliary base, such as triethylamine.

Compounds corresponding to Formula (IV) are obtained, for example, by reacting the corresponding tin oxides with alkane thiols, cycloalkane thiols, thiophenols, etc., with the separation of water, and also by reacting the tin dihalides with alkali salts of the corresponding thiols or by reaction with the thiols in the presence of an auxiliary base.

Compounds corresponding to Formula (VI) are obtained, for example, by reacting the corresponding tin oxides with carboxylic acids—with the separation of water—and also by reacting the tin halides with alkali salts of the corresponding carboxylic acids.

Compounds corresponding to Formulae (III),(V) and (VII) are obtained by reacting the tin compounds corresponding to Formulae (II), (IV) and (VI) with the tin sulfide corresponding to Formula (I). The reaction is carried out in a solvent free from hydroxyl groups, such as, for example, benzene, toluene, chlorobenzene, nitrobenzene, dioxane, tetrahydrofuran, tetrachloromethane, diethyl ether, glycol dimethyl ether, preferably toluene. If the compounds corresponding to Formula (III), (IV) or (VI), or both reactants, are liquid at room temperature, the reaction is preferably carried out in the absence of a solvent. Combination of the two reactants is exothermic, the reaction being completed after 2 hours at 80° C.

Compounds corresponding to Formulae (XI) through (XIII) are formed by reacting compounds corresponding to general Formulae (VIII) through (X) with a tin (poly)sulfide corresponding to Formula (I), in accordance with the equation:

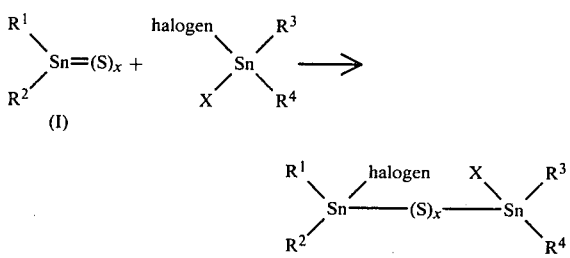

Formula (VIII), $X = OR^5$; Formula (XI), $X = OR^5$;
Formula (IX), $X = SR^6$; Formula (XII), $X = SR^6$;
Formula (X), $X = OCOR^7$; Formula (XIII), $X = OCOR^7$.
$1 \leq x \leq 4$ Compounds corresponding to Formula (VII) are, for example, products from the reaction of 1 mole of a dialkyl, diaryl, dicyclohexyl or dialkaryl tin dihalide with 1 mole of an alkali salt of an alkyl, cycloalkyl, aryl or alkaryl hydroxy compounds or are formed by an equilibration reaction from, for example, dialkyl tin bis-(alkoxides) and dialkyl tin dihalides (A. G. Davies and P. G. Harrison, J. Chem. Soc., (C), 1967, 298).

Compounds corresponding to Formulae (IX) and (X) are formed in the same way as compounds corresponding to Formulae (VIII), and have already been described in the literature (A. G. Davies and P. G. Harrison, J. Chem. Soc. (C), 1967, 298; A. G. Parker and C. I. Carman, Advances in Chem. Ser., 169, 363, (1978); A. Michel et al., Polymer Degradation and Stability, 2, 277 (1980); and T. N. Mitchell, J. Organometal. Chem., 59, 189 (1973)).

The foregoing observations on the synthesis of compounds corresponding to Formulae (III), (V) and (VII) apply to the reaction of compounds corresponding to Formulae (VIII) through (X) with compounds corresponding to Formula (I).

The compounds corresponding to Formulae (III), (V), (VII), (XI), (XII) and (XIII) are liquids or low-melting solids which form clear solutions in all the usual organic solvents as well as in hydroxyl compounds of the type used for the production of polyurethane plastics. They are odorless or have only a faint odor.

Compounds corresponding to the general formula in which $R^1$ and $R^2$ and also $R^3$ and $R^4$ are the same and represent $C_1$-$C_8$-alkyl radicals and in which $R^5$, $R^6$ and $R^7$ represent a $C_1$-$C_{12}$-alkyl radical are preferred.

Where $X^1$ or $X^2$ is a halogen atom, the halogen atom is preferably a chlorine atom. In addition, x preferably has a value of 1.

According to the invention, the following distanthians are preferably used:

1,1,3,3tetramethyl-1,3-bis-(oxyethyl)-distanthian
1,1,3,3-tetra-n-butyl-1,3-bis-(oxyethyl)-distanthian
1,1,3,3-tetra-n-octyl-1,3-bis-(oxyethyl)-distanthian
1,1-dimethyl-3,3-di-n-butyl-1,3-bis-(oxyethyl)-distanthian
1,1-dimethyl-3,3-di-n-butyl-1,3-bis-(oxy-n-butyl)-distanthian
1,1-dimethyl-3,3-di-n-butyl-1,3-bis-(oxy-i-octyl)-distanthian
1,1,3,3-tetra-n-butyl-1,3-bis-(oxy-i-octyl)-distanthian
1,1,3,3-tetramethyl-1,3-bis-(thio-n-butyl)-distanthian
1,1,3,3-tetrabutyl-1,3-bis-(thio-n-butyl)-distanthian
1,1,3,3-tetramethyl-1,3-bis-(thiolauryl)-distanthian
1,1,3,3-tetrabutyl-1,3-bis-(thiolauryl)-distanthian
1,1-dimethyl-3,3-di-n-butyl-1,3-bis-(thiolauryl)-distanthian
1,1-dibutyl-3,3-di-i-octyl-1,3-bis-(thiolauryl)-distanthian
1,1,3,3-tetramethyl-1,3-bis-(oxycarbonylmethyl)-distanthian
1,1,3,3-tetra-n-butyl-1,3-bis-(oxycarbonylmethyl)-distanthian
1,1-dimethyl-3,3-di-n-butyl-1,3-bis-(oxycarbonylmethyl)-distanthian
1,1-di-n-butyl-3,3-di-i-octyl-1,3-bis-(oxycarbonylmethyl)-distanthian
1,1,3,3-tetramethyl-1,3-bis-(oxycarbonylheptyl)-distanthian
1,1,3,3-tetrabutyl-1,3-bis-(oxycarbonylheptyl)-distanthian
1,1-dimethyl-3,3-di-n-butyl-1,3-bis-(oxycarbonylheptyl)-distanthian
1,1-dimethyl-3,3-di-i-octyl-1,3-bis-(oxycarbonylheptyl)-distanthian
1,1-dibutyl-3,3-di-i-octyl-1,3-bis-(oxycarbonylheptyl)-distanthian
1,1,3,3-tetra-i-octyl-1,3-bis-(oxycarbonylheptyl)-distanthian
1,1,3,3-tetramethyl-1,3-bis-(oxycarbonylundecyl)-distanthian
1,1,3,3-tetra-n-butyl-1,3-bis-(oxycarbonylundecyl)-distanthian
1,1,3,3-tetra-i-octyl-1,3-bis-(oxycarbonylundecyl)-distanthian
1,1-dimethyl-3,3-di-n-butyl-1,3-bis-(oxycarbonylundecyl)-distanthian
1,1-dimethyl-3,3-di-i-octyl-1,3-bis-(oxycarbonylundecyl)-distanthian
1,1-dibutyl-3,3-di-i-octyl-1,3-bis-(oxycarbonylundecyl)-distanthian
1,1,3,3-tetramethyl-1-oxycarbonylmethyl-3-chlorodistanthian
1,1,3,3-tetra-n-butyl-1-oxycarbonylmethyl-3-chlorodistanthian
1,1-dimethyl-1-oxycarbonylmethyl-3,3-dibutyl-3-chlorodistanthian
1,1,3,3-tetramethyl-oxycarbonylheptyl-3-chlorodistanthian
1,1,3,3-tetra-n-butyl-1-oxycarbonylheptyl-3-chlorodistanthian
1,1,3,3-tetramethyl-1-oxycarbonylundecyl-3-chlorodistanthian 1,1,3,3-tetra-n-butyl-1-oxycarbonylundecyl-3-chlorodistanthian 1,1-dimethyl-1-oxycarbonylundecyl-3,3-di-n-butyl-3-chlorodistanthian 1,1-dimethyl-1-oxycarbonylundecyl-3,3-di-n-butyl-3-chlorodistanthian 1,1-dimethyl-1-chloro-3,3-di-n-butyl-3-oxycarbonylundecyl-distanthian 1,1-di-n-butyl-1-oxymethyl-3,3-di-i-octyl-3-chlorodistanthian 1,1,3,3-tetra-n-butyl-1-thioundecyl-3-chlorodistanthian Compounds having an increased sulfur content may also be formed, depending on the particular process used for producing the tin sulfides corresponding to Formula (I). This is attributed to the presence of polysulfide structures ($1 \leq x \leq 4$).

To lower the melting point and to increase solubility, it is often preferred to use compounds in which the hydrocarbon radicals are isomer mixtures as in the hydroxy, mercapto or carboxyl compounds required for the production of compounds corresponding to Formulae (II), (IV), (VI), (VIII), (IX) and (X). As a result of the use these isomeric hydrocarbon radicals, as starting components, the tin catalysts used in accordance with the invention may also be isomer mixtures.

The activators according to the invention may generally be dissolved without difficulty in either the compounds containing at least two active hydrogen atoms and having a molecular weight of from 400 to 10,000 or in the isocyanate component.

They are preferably dissolved with heating in the compounds containing at least two active hydrogen atoms and having a molecular weight of from 400 to 10,000—surprisingly without any reaction between the halogen-containing compounds of Formulae (XI) through (XIII) and the polyol component.

The materials described hereafter are used for carrying out the process according to the invention.

As starting components, aliphatic, cycloaliphatic, araliphatic, aromatic and heterocyclic polyisocyanates of the type described, for example, by W. Siefken in Justus Liebigs Annalen der Chemie, 562, pages 75 to 136, may be used. Suitable isocyanates corresponding, for example, to the formula

wherein n=2–4, preferably 2; and Q represents an aliphatic hydrocarbon radical containing from 2 to 18, and preferably from 6 to 10, carbon atoms, a cycloaliphatic hydrocarbon radical containing from 4 to 15, and preferably from 5 to 10, carbon atoms, an aromatic hydrocarbon radical containing from 6 to 15, and preferably from 6 to 13, carbon atoms, or an araliphatic hydrocarbon radical containing from 8 to 15, and preferably from 8 to 13, carbon atoms. Specific isocyanates include, for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and 1,4-diisocyanate and mixtures of these isomers; and 1-isocyanato-3,3,5-trimethyl-5-isocyanato-methyl cyclohexane (German Auslegeschrift No. 1,202,785 and U.S. Pat. No. 3,401,190). Additional examples include 2,4- and 2,6-hexahydrotolylene diisocyanate and mixtures of these isomers; hexahydro-1,3- and/or 1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; and naphthylene-1,5-diisocyanate.

According to the invention, it is also possible, for example, to use triphenyl methane-4,4',4"-triisocyanate; polyphenyl polymethylene polyisocyanates of the type obtained by condensing aniline with formaldehyde, followed by phosgenation, and described, for example, in British Patent Nos. 874,430 and 848,671; and m- and p-isocyanatophenyl sulfonyl isocyanates according to U.S. Pat. No. 3,454,606. Perchlorinated aryl polyisocyanates of the type described, for example, in German Auslegeschrift No. 1,157,601 (U.S. Pat. No. 3,277,138); polyisocyanates containing carbodiimide groups of the type described in German Patent No. 1,092,007 (U.S. Pat. No. 3,152,162) and in German Offenlegungsschrift Nos. 2,504,400, 2,537,685 and 2,552,350; and norbornane diisocyanates according to U.S. Pat. No. 3,492,330, may also be used. Further polyisocyanates containing allophanate groups of the type described, for example, in British Patent No. 994,890, Belgian Patent No. 761,626 and Dutch Patent Application No. 7,102,524; polyisocyanates containing isocyanurate groups of the type described, for example, in U.S. Pat. No. 3,001,973, German Patent No. 1,022,789, No. 1,222,067 and No. 1,027,394, and in German Offenlegungsschrift Nos. 1,929,034 and 2,004,048; polyisocyanates containing urethane groups of the type described, for example, in Belgian Patent No. 752,261 or in U.S. Pat. Nos. 3,394,164 and 3,644,457; polyisocyanates containing acylated urea groups according to German Patent No. 1,230,778 and polyisocyanates containing biuret groups of the type described, for example, in U.S. Pat. No. 3,124,605, No. 3,201,372 and in British Patent No. 889,050 are suitable starting components. Additionally, polyisocyanates produced by telomerization reactions of the type described, for example, in U.S. Pat. No. 3,654,106; polyisocyanates containing ester groups of the type described, for example, in British Patent Nos. 965,474, and 1,072,956, U.S. Pat. No. 3,567,763 and German Patent No. 1,231,688; reaction products of the above-mentioned diisocyanates with acetals according to German Patent No. 1,072,385; and polyisocyanates containing polymeric fatty acid esters according to U.S. Pat. No. 3,455,883, may also be used.

It is possible to use the isocyanate-group-containing distillation residues obtained in the commercial production of isocyanates, optionally in solution in one or more of the above-mentioned polyisocyanates, and it is also possible to use any mixtures of the above-mentioned polyisocyanates.

In general, it is particularly preferred to use the commercially-readily-available polyisocyanates, for example, 2,4- and 2,6-tolylene diisocyanate, and mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates"). Modified polyisocyanates of the type derived from 2,4- and/or 2,6-tolylene diisocyanate or from 4,4'- and/or 2,4'-diphenyl methane diisocyanate, are especially preferred.

As further starting components, compounds containing at least two isocyanate-reactive hydrogen atoms and having molecular weights generally of from 400 to 10,000 may be used. In addition to compounds containing amino groups, thiol groups or carboxyl groups, compounds such as these include, preferably, compounds containing hydroxyl groups, particularly compounds containing from 2 to 8 hydroxyl groups, and most particularly, those having molecular weights of from 1000 to 8000, preferably from 1500 to 6000. Such compounds include, for example, polyesters, polyethers, polythioethers, polyacetals, polycarbonates and polyester amides containing at least 2, generally from 2 to 8, but preferably from 2 to 4, hydroxyl groups, of the type known for the production of homogeneous and cellular polyurethanes.

The polyesters containing hydroxyl groups suitable for use in accordance with the invention include, for example, reaction products of polyhydric, preferably dihydric and, optionally, trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic, and may, optionally, be substituted, for example, by halogen atoms, and/or may be unsaturated.

Examples of carboxylic acids such as these and their derivatives include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride and glutaric acid anhydride. Additional examples include maleic acid; maleic acid anhydride; fumaric acid; dimerized and trimerized unsaturated fatty acids; optionally in admixture with monomeric unsaturated fatty acids, such as oleic acid; terephthalic acid dimethyl ester; and terephthalic acid-bis-glycol ester.

Suitable polyhydric alcohols include, for example, ethylene glycol, 1,2- and 1,3-propylene glycol, 1,4- and 2,3-butylene glycol, 1,6-hexane diol, 1,8-octane diol, neopentyl glycol, 1,4-bis-hydroxymethyl cyclohexane, 2-methyl-1,3-propane diol, glycerol and trimethylol propane. Other suitable polyhydric alcohols include 1,2,6-hexane triol, 1,2,4-butane triol, trimethylol ethane, pentaerythritol, quinitol, mannitol, and sorbitol, dehydromannitol, and dehydrosorbitol, formitol, methyl glycoside, diethylene glycol, triethylene glycol, tetraethylene glycol and higher polyethylene glycols, dipropylene glycol and higher polypropylene glycols, dibutylene glycol and higher polybutylene glycols.

The polyesters may contain terminal carboxyl groups and polyesters of lactones, for example, ε-caprolactone, or of hydroxy carboxylic acids, for example, ω-hydroxy caproic acid, may also be used.

Suitable polyethers containing at least 2, generally 2 to 8, and preferably 2 to 3, hydroxyl groups for use in accordance with the invention are also known. These polyethers are obtained, for example, by polymerizing epoxides, such as ethylene oxide, propylene oxide, butylene oxide, tetrahydrofuran, styrene oxide or epichlorohydrin on their own, for example, in the presence of Lewis catalysts, such as $BF_3$, or by the addition of these epoxides, preferably ethylene oxide and propylene oxide, optionally in admixture or successively, with starter components containing reactive hydrogen atoms. Such starter components include water, alcohols, ammonia or amines, for example, ethylene glycol, 1,3-propylene glycol or 1,2-propylene glycol, trimethylol propane, glycerol, sorbitol, 4,4'-dihydroxy diphenyl propane, aniline, ethanolamine or ethylene diamine. Sucrose polyethers of the type described, for example, in German Auslegeschrift Nos. 1,176,358 and 1,064,938 and formitol- or formose-started polyethers (German Offenlegungsschrift Nos. 2,639,083 and 2,737,951) may also be used in accordance with the invention.

In many cases, it is preferred to use polyethers which predominantly contain primary OH-groups (up to 90% by weight, based on all the OH-groups present in the polyether). Polybutadienes containing OH-groups are also suitable for use in accordance with the invention.

Among the polythioesters suitable for use are, particularly, the condensation products of thiodiglycol on its own and/or with other glycols, dicarboxylic acids, formaldehyde, aminocarboxylic acids or amino alcohols, and, depending on the co-components, for example, polythio mixed ethers, polythioether esters or polythioether ester amides.

Suitable polyacetals include, for example, the compounds obtainable from glycols such as diethylene glycol, triethylene glycols, 4,4'-dioxethoxy diphenyl dimethyl methane, hexane diol and formaldehyde and those obtained by polymerizing cyclic acetals such as, for example, trioxane (German Offenlegungsschrift No. 1,694,128).

Suitable polycarbonates containing hydroxyl groups are known and can be obtained, for example, by reacting diols, such as 1,3-propane diol, 1,4-butane diol and/or 1,6-hexane diol, diethylene glycol, triethylene glycol, tetraethylene glycol or thiodiglycol, with diaryl carbonates, for example, diphenyl carbonate, or phosgene (German Auslegeschrift No. 1,694,080; No. 1,915,908 and No. 2,221,751 and German Offenlegungsschrift No. 2,605,024).

Suitable polyester amides and polyamides include, for example, the predominantly linear condensates obtained from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups, optionally modified natural polyols, such as castor oil or carbohydrates, for example, starch, and addition products of alkylene oxides with phenol-formaldehyde resins, or even with urea-formaldehyde resins, may also be used in accordance with the invention.

Before they are used in the polyisocyanate-polyaddition process, the above-mentioned polyhydroxyl compounds may be modified in various ways. According to German Offenlegungsschrift Nos. 2,210,839 (U.S. Pat. No. 3,849,515) and 2,544,195, a mixture of different polyhydroxyl compounds (for example, a polyether and a polyester polyol) may be condensed by etherification in the presence of a strong acid to form a relatively high molecular weight polyol which is made up of different segments attached through ether bridges. It is also possible, for example, in accordance with German Offenlegungsschrift No. 2,559,372, to introduce amide groups into the polyhydroxyl compounds or, in accordance with German Offenlegungsschrift No. 2,620,487, to introduce triazine groups by reaction with polyfunctional cyanic acid esters. The reaction of a polyol with a less than equivalent quantity of a diisocyanatocarbodiimide, followed by reaction of the carbodiimide group with an amine, amide, phosphite or carboxylic acid, gives polyhydroxyl compounds containing guanidine, phosphonoformamidine or acyl urea groups (German Offenlegungsschrift No. 2,714,289, No. 2,714,292 and No. 2,714,293). In some cases, it is of particular advantage to completely or partly convert the relatively high molecular weight polyhydroxyl compounds into the corresponding anthranilic acid esters by reaction with isatoic acid anhydride, as described in German Offenlegungsschrift Nos. 2,019,432 and 2,619,840 and in U.S. Pat. No. 3,808,250, No. 3,975,428 and No. 4,016,143, thus creating relatively high molecular weight compounds containing terminal aromatic amino groups.

According to German Offenlegungsschrift No. 2,546,536 and U.S. Pat. No. 3,865,791, relatively high molecular weight compounds containing terminal amino groups are obtained by reacting NCO prepolymers with enamines, aldimines or ketimines containing hydroxyl groups, followed by hydrolysis. Further processes for producing relatively high molecular weight compounds containing terminal amino groups or hydrazide groups are described in German Offenlegungsschrift No. 1,694,152 (U.S. Pat. No. 3,625,871).

According to the invention, it is also possible to use polyhydroxyl compounds containing high molecular weight polyadducts and polycondensates or polymers in finely dispersed or dissolved form. Polyhydroxyl compounds such as these are obtained, for example, by carrying out polyaddition reactions (such as reactions between polyisocyanates and amino-functional compounds) and polycondensation reactions (for example, between formaldehyde and phenols and/or amines) in situ in the above-mentioned compounds containing hydroxyl groups. Processes such as these are described, for example, in German Auslegeschrift Nos. 1,168,075 and 1,260,142 and in German Offenlegungsschrift Nos. 2,324,134; 2,423,984; 2,512,385; 2,513,815; 2,550,796; 2,550,797; 2,550,833; 2,550,862; 2,633,293 and 2,639,254. However, it is also possible, in accordance with U.S. Pat. No. 3,869,413 or German Offenlegungsschrift No. 2,550,860, to mix an aqueous polymer dispersion with a polyhydroxyl compound and subsequently to remove the water from the mixture.

Polyhydroxyl compounds modified by vinyl polymers of the type obtained, for example, by polymerizing styrene and acrylonitrile in the presence of polyethers (U.S. Pat. Nos. 3,383,351; 3,304,273; 3,523,093 and 3,110,695 and German Auslegeschrift No. 1,152,536) or polycarbonate polyols (German Patent No. 1,769,795 and U.S. Pat. No. 3,637,909) are also suitable for use in the process according to the invention.

Plastics having particularly good flameproof properties are obtained by using polyether polyols modified in accordance with German Offenlegungsschrift No. 2,442,101; No. 2,644,922 and No. 2,646,141 by graft polymerization with vinyl phosphonic acid esters and, optionally, (meth)acrylonitrile, (meth)acrylamide or OH-functional (meth)acrylic acid esters. Polyhydroxyl compounds into which carboxyl groups have been introduced by radical graft polymerization with unsaturated carboxylic acids and, optionally, other olefinically unsaturated monomers (German Offenlegungsschrift No. 2,714,291, No. 2,739,620 and No. 2,654,746) may be used with particular advantage in combination with mineral fillers.

Where modified polyhydroxyl compounds of the type mentioned above are used as starting components in the polyisocyanate-polyaddition process, polyurethane plastics having considerably improved mechanical properties are formed in many cases.

Representatives of the above-mentioned compounds used in accordance with the invention are described, for example, in High Polymers, Vol. XVI, "Polyurethanes, Chemistry and Technology", by Saunders-Frisch, Interscience Publishers, New York/London, Vol. I, 1962, pages 32 to 42 and pages 44 to 54 and Vol. II, 1964, pages 5–6 and 198–199, and in Kunststoff-Handbuch, Vol. VII, Vieweg-Hochtlen, Carl-Hanser-Verlag, Munich, 1966, for example, on pages 45 to 71.

It is, of course, possible to use mixtures of the above-mentioned compounds containing at least two isocyanate-reactive hydrogen atoms and having a molecular weight of from 400 to 10,000, such as mixtures of polyethers and polyesters. In some cases, it is of particular advantage to combine low-melting and high-melting polyhydroxyl compounds with one another (German Offenlegungsschrift No. 2,706,297).

Optional starting components include compounds containing at least two isocyanate-reactive hydrogen atoms and having a molecular weight of from 32 to 400, and preferably from 62 to 350. In this case, too, the compounds in question are compounds containing hydroxyl groups and/or amino groups and/or thiol groups and/or carboxyl groups, preferably compounds containing hydroxyl groups and/or amino groups which serve as chain extenders or crosslinkers. These compounds generally contain from 2 to 8, and preferably from 2 to 4, isocyanate-reactive hydrogen atoms and mixtures of different compounds containing at least two isocyanate-reactive hydrogen atoms and having a molecular weight in the range of from 32 to 400 may also be used.

Examples of compounds such as these include ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis-hydroxymethyl cyclohexane, 2-methyl-1,3-propane diol, dibromobutene diol (U.S. Pat. No. 3,723,392), glycerol, trimethylol propane, 1,2,6-hexane triol, trimethylol ethane, pentaerythritol, quinitol, mannitol and sorbitol. Additional examples include castor oil, diethylene glycol, triethylene glycol, tetraethylene glycol, higher polyethylene glycols having a molecular weight of up to 400, dipropylene glycol, higher polypropylene glycols having a molecular weight of up to 400, dipropylene glycol, higher polypropylene glycols having a molecular weight of up to 400, dibutylene glycol, higher polybutylene glycols having a molecular weight of up to 400, 4,4′-dihydroxy diphenyl propane, dihydroxy methyl hydroquinone, ethanolamine, diethanolamine, N-methyl diethanolamine, triethanolamine and 3-aminopropanol.

Other low molecular weight polyols suitable for the purposes of the invention include the mixtures of hydroxy aldehydes and hydroxy ketones ("formose") or the polyhydrix alcohols obtained therefrom by reduction ("formitol") which are formed in the autocondensation of formaldehyde hydrate in the presence of metal compounds as catalysts and compounds capable of enediol formation as co-catalysts (German Offenlegungsschrift Nos. 2,639,084; 2,714,084; 2,714,104; 2,721,186; 2,738,154; and 2,738,512). In order to obtain plastics with improved flame resistance, these formoses are advantageously used in combination with aminoplast formers and/or phosphites (German Offenlegungsschrift Nos. 2,738,513 and 2,738,532). Solutions of polyisocyanate-polyaddition products, particularly solutions of polyurethane ureas containing ionic groups and/or solutions of polyhydrazodicarbonamides, in low molecular weight polyhydric alcohols may also be used as polyol component in accordance with the invention (German Offenlegungsschrift No. 2,638,759).

Aliphatic diamines suitable for use in accordance with the invention includes, for example, ethylene diamine, 1,4-tetramethylene diamine, 1,11-undecamethylene diamine, 1,12-dodecamethylene diamine and mixtures thereof, 1-amino-3,3,5-trimethyl-5-aminomethyl cyclohexane ("isophorone diamine"), 2,4- and 2,6-hexahydrotolylene diamine and mixtures thereof, perhydro-2,4'- and -4,4'-diaminodiphenyl methane, p-xylylene diamine, bis-(3-aminopropyl)-methyl-amine, diaminoperhydro anthracenes (German Offenlegungsschrift No. 2,638,731) and cycloaliphatic triamines according to German Offenlegungsschrift No. 2,614,244. It is also possible in accordance with the invention to use hydrazine and substituted hydrazines, for example, methyl hydrazine, N,N'-dimethyl hydrazine and their homologs and also acid dihydrazides, for example, carbodihydrazide, oxalic acid dihydrazide, the dihydrazides of malonic acid, succinic acid, glutaric acid, adipic acid, β-methyl adipic acid, sebacic acid, hydracrylic acid and terephthalic acid. Further suitable hydrazines and substituted hydrazines include semicarbazido alkylene hydrazides such as, for example, β-semicarbazido propionic acid hydrazide (German Offenlegungsschrift No. 1,770,591), semicarbazido alkylene carbazinic esters such as, for example, 2-semicarbazido ethyl carbazinic ester (German Offenlegungsschrift No. 1,918,504) or even amino-semicarbazide compounds such as, for example, β-amino-ethyl semicarbazido carbonate (German Offenlegungsschrift No. 1,902,931). To control their reactivity, the amino groups may be completely or partly blocked by aldimine or ketimine groups (U.S. Pat. No. 3,734,894 and German Offenlegungsschrift No. 2,637,115).

Examples of aromatic diamines include bisanthranilic acid esters according to German Offenlegungsschrift Nos. 2,040,644 and 2,160,590, 3,5- and 2,4-diamino-benzoic acid esters according to German Offenlegungsschrift No. 2,025,900 and the diamines containing ester groups described in German Offenlegungsschrift Nos. 1,803,635 (U.S. Pat. Nos. 3,681,290 and 3,736,350), 2,040,650 and 2,160,589. Additional examples include the diamines containing ether groups according to German Offenlegungsschrift Nos. 1,770,525 and 1,809,172 (U.S. Pat. Nos. 3,654,364 and 3,736,295), 2-halogen-1,3-phenylene diamines optionally substituted in the 5-position (German Offenlegungsschrift No. 2,001,772, No. 2,025,896 and No. 2,065,869), 3,3'-dichloro-4,4'-diaminodiphenyl methane, tolylene diamine, 4,4'-diamino-diphenyl methane and 4,4'-diamino-diphenyl disulfides (German Offenlegungsschrift No. 2,404,976). Also, diaminodiphenyl dithioethers (German Offenlegungsschrift No. 2,509,404), aromatic diamines substituted by alkyl thio groups (German Offenlegungsschrift No. 2,638,760), diaminobenzene phosphonic acid esters (German Offenlegungsschrift No. 2,459,491), aromatic diamines containing sulfonate or carboxylate groups (German Offenlegungsschrift No. 2,720,166) and the high-melting diamines described in German Offenlegungsschrift No. 2,635,400 may be used according to the invention. Examples of aliphatic-aromatic diamines include the aminoalkyl thioanilines according to German Offenlegungsschrift No. 2,734,574.

According to the invention, other suitable chain extenders include such compounds as 1-mercapto-3-aminopropane, optionally-substituted amino acids, for example, glycine, alanine, valine, serine and lysine and optionally substituted dicarboxylic acids, for example, succinic acid, adipic acid, phthalic acid, 4-hydroxy phthalic acid and 4-aminophthalic acid.

In addition, isocyanate-monofunctional compounds may be used as so-called chain terminators in proportions of from 0.01 to 10% by weight, based on polyurethane solids. Monofunctional compounds such as these include, for example, monoamines, such as butyl and dibutylamine, octylamine, stearylamine, N-methyl stearylamine, pyrrolidine, piperidine and cyclohexylamine, monoalcohols, such as butanol, 2-ethyl hexanol, octanol, dodecanol, the various amyl alcohols, cyclohexanol and ethylene glycol monoethyl ether.

Optional additives and auxiliaries suitable for use according to the invention include blowing agents, co-catalysts, surface-active agents and various other additives.

Water and/or readily volatile inorganic or organic substances may be used as blowing agents according to the invention. Organic blowing agents include, for example, acetone, ethylacetate, halogen-substituted alkanes, such as methylene chloride, chloroform, ethylidene chloride, vinylidene chloride, monofluorotrichloromethane, chlorodifluoromethane, dichlorodifluoromethane, butane hexane, heptane or diethyl ether, while possible inorganic blowing agents include, for example, air, $CO_2$ or $N_2O$.

A blowing effect may also be obtained by adding compounds (for example, azo compounds, such as azodicarbonamide or azoisobutyronitrile) which decompose at temperatures above room temperature giving off gases, such as nitrogen. Other examples of blowing agents and information on the use of blowing agents may be found in Kunststoff-Handbuch, Vol. VII, by Vieweg and Hochtlen, Carl-Hanser-Verlag, Munich, 1966, for example, on pages 108 to 109, 453 to 455 and 507 to 510.

Known co-catalysts, for example, tertiary amines, such as triethylamine, tributylamine, N-methyl morpholine, N-ethyl morpholine, N,N,N',N'-tetramethyl ethylene diamine, pentamethyl diethylene triamine and higher homologs (German Offenlegungsschrift Nos. 2,624,527 and 2,624,528), 1,4-diazabicyclo-(2,2,2)-octane, N-methyl-N'-dimethylaminoethyl piperazine, bis-(dimethyl-aminoalkyl)-piperazines (German Offenlegungsschrift No. 2,636,787), N,N-dimethyl benzylamine, N,N-dimethyl cyclohexyl amine, N,N-diethyl benzylamine and bis-(N,N-diethyl aminoethyl)adipate may be used according to the invention. Additional suitable co-catalysts include N,N,N',N-tetramethyl-1,3-butane diamine, N,N-dimethyl-β-phenyl ethylamine, 1,2-dimethyl imidazole, 2-methyl imidazole, monocyclic and bicyclic amidines (German Offenlegungsschrift No. 1,720,633), bis-(dialkylamino)-alkyl ethers (U.S. Pat. No. 3,330,782, German Auslegeschrift No. 1,030,558 and German Offenlegungsschrift Nos. 1,804,361 and 2,618,280) and tertiary amines containing amide groups (preferably formamide groups) according to German Offenlegungsschrift Nos. 2,523,633 and 2,732,292. Suitable co-catalysts also include known Mannich bases of secondary amines, such as dimethylamine, and aldehydes, preferably formaldehyde, or ketones, such as acetone, methylethyl ketone or cyclohexanone, and phenols, such as phenol, nonyl phenol or bisphenol.

Tertiary amines containing isocyanate-reactive hydrogen atoms suitable for use as co-catalysts according to the invention include, for example, trietnanolamine, triisipropanolamine, N-methyl diethanolamine, N-ethyl diethanolamine, N,N-dimethylethanolamine, their reaction products with alkylene oxides (e.g., propylene oxide and/or ethylene oxide), and secondary-tertiary amines according to German Offenlegungsschrift No. 2,732,292. Other suitable co-catalysts include sila-amines containing carbon-silicon bonds, of the type described, for example, in German Pat. No. 1,229,290 (corresponding to U.S. Pat. No. 3,620,984), for example, 2,2,4-trimethyl-2-silamorpholine and 1,3-diethylaminomethyl tetramethyl disiloxane, nitrogen-containing bases, such as tetraalkyl ammonium hydroxides, alkali hydroxides, such as sodium hydroxide, alkali phenolates, such as sodium phenolate, or alkali alcoholates, such as sodium methylate. Hexahydrotriazines may also be used as co-catalysts (German Offenlegungsschrift No. 1,769,043).

The reaction between NCO-groups and Zerewitin-off-active hydrogen atoms is also greatly accelerated by lactams and azalactams, with an intermediate being formed between between the lactams and the compound containing acid hydrogen. Intermediates such as these and their catalytic effect are described in German Offenlegungsschrift Nos. 2,062,288; 2,062,289; 2,117,576 (U.S. Pat. Nos. 3,758,444); 2,129,198; 2,330,175 and 2,330,211.

According to the invention, it is also possible to use organometallic compounds, particularly organotin compounds having a structure different from that of the tin compounds which have to be used in accordance with the invention as co-catalysts. In addition to sulfur-containing compounds, such as di-n-octyl tin mercaptide (German Auslegeschrift No. 1,769,367 and U.S. Pat. No. 3,654,927), preferred organotin compounds include tin (II) salts of carboxylic acids, such as tin (II) acetate, tin (II) octoate, tin (II) ethyl hexoate and tin (II) laurate, and tin (IV) compounds, such as dibutyl tin oxide, dibutyl tin dichloride, dibutyl tin diacetate, dibutyl tin dilaurate, dibutyl tin maleate and dioctyl tin diacetate.

All the above-mentioned co-catalysts may, of course, be used in the form of mixtures, with combinations of organometallic compounds and amidines, aminopyridines or hydrazino pyridines (German Offenlegungsschrift No. 2,434,185, No. 2,601,082 and No. 2,603,834) of particular interest. The co-catalysts are generally used in a quantity of from about 0.001 to 10% by weight, based on the total quantity of compounds containing at least two ioscyanate-reactive hydrogen atoms.

Further representatives of catalysts suitable for use in accordance with the invention and information on the way in which they work may be found in Kunststoff-Handbuch by Vieweg and Hochtlen, Vol. VII, Carl-Hanser-Verlag, Munich 1966, for example, on pages 96 to 102.

Surface-active additives, such as emulsifiers and foam stabilizers, may be used according to the invention. Suitable emulsifiers include, for example, the sodium salts of castor oil sulfonates or salts of fatty acids with amines, such as diethylamine oleate or diethanolamine stearate. Alkali or ammonium salts of sulfonic acids, such as, for example, dodecyl benzene sulfonic acid or dinaphthyl methane disulfonic acid, or of fatty acids, such as ricinoleic acid, or of polymeric fatty acids, may also be used as surface-active additives.

Suitable foam stabilizers include, above all, polyether siloxanes, particularly water soluble types. The structure of these compounds is generally such that a copolymer of ethylene oxide and propylene oxide is attached to a polydimethyl siloxane residue. Foam stabilizers such as these are described, for example, in U.S. Pat. No. 2,834,748, No. 2,917,480 and No. 3,629,308. In many cases, polysiloxane-polyoxyalkylene copolymers branched through allophanate groups, according to German Offenlegungsschrift No. 2,558,523, are of particular interest.

Reaction retarders, for example, acid-reacting substances, such as hydrochloric acid or organic acid halides; known cell regulators, such as paraffins or fatty alcohols or dimethyl polysiloxanes; known pigments or dyes; known flameproofing agents, such as tris-chloroethyl phosphate, tricresyl phosphate or ammonium phosphate and polyphosphate; stabilizers against the effects of ageing and weather; plasticizers; fungistatic and bacteriostatic substances; as well as fillers, such as barium sulfate, kieselguhr, carbon black or whiting may also be used according to the invention.

Further examples of surface-active additives and foam stabilizers, cell regulators, reaction retarders, stabilizers, flameproofing agents, plasticizers, dyes, fillers, fungistatic and bacteriostatic substances which may optionally be used in accordance with the invention, and information on the way in which these additives are used and in their respective modes of action, may be found in Kunststoff-Handbuch by Vieweg and Hochtlen, Vol. VII, Carl-Hanser-Verlag, Munich 1966, for example, on pages 103 to 113.

The process according to the invention may be carried out by reacting the reaction components by the known one-shot process, by the prepolymer process or by the semi-prepolymer process, in many cases using machines, for example, of the type described in U.S. Pat. No. 2,764,565. Particulars of processing machines which may also be used in accordance with the invention, may be found in Kunststoff-Handbuch by Vieweg and Hochtlen, Vol. VII, Carl-Hanser-Verlag, Munich, 1966, for example, on pages 121 to 205.

In the production of foams, it is also possible, in accordance with the invention, to carry out foaming in closed molds. To this end, the reaction mixture is introduced into a mold made of suitable mold materials, such as, metals, for example, aluminum, or plastics, for example, epoxide resin. The foamable reaction mixture foams in the mold, forming the molding.

In-mold foaming may be carried out in such a way that the molding has a cellular structure at its surface, although it may also be carried out in such a way that the molding has a compact skin and a cellular core. In this connection, it is possible, in accordance with the invention, to introduce the foamable reaction mixture into the mold in such a quantity that the foam formed just fills the mold. However, it is also possible to introduce more foamable reaction mixture into the mold than is required for filling the interior of the mold with foam. This particular technique is known as overcharging and is shown, for example, in U.S. Pat. Nos. 3,178,490 and 3,182,104. The production of integral skin foams, i.e., foam moldings having an impervious outer skin, which does not suddenly merge with the foam core, and a foam core having a decreasing density of which the minimum lies substantially in the middle of the mold-parting cross-section, is described in German Auslegeschrift No. 1,694,138.

In many cases, known "external release agents" such as silicone oils, are used for in-mold foaming. However, it is also possible to use so-called "internal release agents", optionally in admixture with external release agents, of the type known, for example, from German Offenlegungsschrift Nos. 2,121,670 and 2,307,589.

According to the invention, it is possible to produced cold-hardening foams (cf., British Patent No. 1,162,517 and German Offenlegungsschrift No. 2,153,086) as well as foams by block foaming or by the known laminator process.

The products obtainable in accordance with the invention may be used, for example, as shoe soles, vehicle steering wheels, arm rests, head rests, upholstery materials, sound-insulating materials, coating materials, packaging materials and mattresses.

The invention is further illustrated, but is not intended to be limited by the following examples in which all parts and percentages are by weight unless otherwise specified.

EXAMPLES

The following starting materials were used:

Polyols

Polyol A: a trifunctional trimethylol-propane-started PO/EO-polyether polyol (weight ratio PO:EO=87:13%) having an OH-number of 28.

Polyol B: a trifunctional trimethylol-propane-started PO-polyether polyol having an OH-number of 865.

Polyol C: a difunctional propylene-glycol-started PO/EO-polyether polyol (weight ratio PO:EO=87:13%) having an OH-number of 28.

Polyol D: a trifunctional trimethylol-propane-started PO/EO polyether polyol having an OH-number of 35.

Polyol E: a trifunctional trimethylol-propane-started PO-polyether polyol having an OH-number of 550.

Polyisocyanates

Isocyanate A: a reaction product of 4,4'-diisocyanatodiphenyl methane and tripropylene glycol having an NCO-content of 22.8%.

Isocyanate B: a reaction product of isophorone diisocyanate and a glycerol-started polypropylene glycol ether (OH-number 670) having an NCO-content of 28%.

Catalysts according to the invention (which are all liquid at 20° C.)

Catalyst A: produced by reacting dimethyl tin sulfide and dibutyl tin dilaurate.

Catalyst B: produced by reacting dimethyl tin sulfide and dibutyl tin bis-(thiododecyl).

Catalyst C: produced by reacting dibutyl tin sulfide and dibutyl tin bis-(thiododecyl)

Catalyst D: produced by reacting dibutyl tin sulfide and dibutyl tin dilaurate.

Catalyst E: produced by reacting dimethyl tin sulfide with di-n-octyl tin di-(thioglycolic acid-i-octylester).

Catalyst F: produced by reacting dibutyl tin sulfide with di-n-octyl tin di-(thioglycolic acid-i-octyl ester).

The reaction times quoted in the Examples are defined as follows:

$T_1$ = cream time (time in seconds after the isocyanate component has been stirred in until the mixture begins to foam);

$T_2$ = rise time (time in seconds after the isocyanate component has been stirred in until the rising process is completed);

$T_3$ = tack-free time (time in seconds after the isocyanate component has been stirred in until the surface of the foam is no longer tacky);

$T_4$ = pluck time (time in seconds after the isocyanate component has been stirred in until it is no longer possible to tear out small pieces of foam with the fingers).

EXAMPLE 1

Stability in Storage of the Distanthian Catalysts Used in Accordance with the Invention (Table 1)

A-Component:
  950 parts of Polyol A
  250 parts of ethylene glycol
  20 parts of Polyol B
  20 parts of emulsifier (sodium sulfonate of lauryl sulfonic acid)
  x parts metal catalyst (Table 1)
  x parts diazabicyclooctane (Table 1)

The water content of the A-component was determined by the Karl Fischer method and amounted to 0.15%.

B-component:
  950 parts of Isocyanate A
  50 parts of dichloromethane

The constituents of the A-component were intensively mixed for 60 seconds at room temperature using a high-speed stirrer and the resulting mixture was first kept in the presence of air for 21 days at 50° C., then stored in the presence of air at room temperature. Immediately after mixing the constituents of the A-component and at regular intervals thereafter, 100 parts of the A-component were foamed with 146 parts of the B-component and the quality of the resulting foam visually assessed.

TABLE I

| Metal Catalyst (quantity) Co-Catalyst (quantity) | | 0 days | 7 days | 21 days | 60 days | 120 days |
|---|---|---|---|---|---|---|
| (Comparison) | | | | | | |
| Dibutyl tin dilaurate | T 1 | 16 | 18 | 20 | 24 | 31 |
| (0.05 g) | T 2 | 24 | 26 | 26 | 30 | 44 |
| Diazabicyclooctane | T 3 | 24 | 26 | 26 | 30 | 44 |
| (0.05 g) | T 4 | 24 | 26 | 26 | 30 | 44 |
| (Comparison) | | | | | | |
| Dibutyl tin bis-(thio- | T 1 | 30 | 33 | 34 | | |
| dodecyl) (0.02 g) | T 2 | 52 | 48 | 43 | | |
| Diazabicyclooctane | T 3 | 52 | 48 | 43 | | |
| (0.02 g) | T 4 | 52 | 48 | 43 | | |
| (Comparison) | | | | | | |
| Lead octoate (0.08 g) | T 1 | 35 | 53 | — | | |
| Diazabicyclooctane | T 2 | 49 | 74 | — | | |
| (0.02 g) | T 3 | 49 | 74 | — | | |
| | T 4 | 49 | 74 | — | | |
| (Comparison) | | | | | | |
| Bismuth octoate (0.2 g) | T 1 | 17 | 53 (4 d) | — | | |
| Diazabicyclooctane | T 2 | 26 | 85 (4 d) | — | | |
| (0.05 g) | T 3 | 26 | 85 (4 d) | — | | |
| | T 4 | 130 | >3 min (4 d) | — | | |
| (According to the invention) | | | | | | |
| Catalyst A (0.05 g) | T 1 | 20 | 20 | 17 | 21 | 22 |
| Diazabicyclooctane | T 2 | 25 | 27 | 25 | 27 | 28 |
| (0.05 g) | T 3 | 25 | 27 | 25 | 27 | 28 |
| | T 4 | 25 | 27 | 25 | 27 | 28 |
| (According to | | | | | | |

TABLE I-continued

| Metal Catalyst (quantity) Co-Catalyst (quantity) the invention) | | 0 days | 7 days | 21 days | 60 days | 120 days |
|---|---|---|---|---|---|---|
| Catalyst B (0.07 g) | T 1 | 15 | 15 | 15 | 16 | 15 |
| Diazabicyclooctane | T 2 | 17 | 20 | 20 | 19 | 20 |
| (0.05 g) | T 3 | 17 | 20 | 20 | 19 | 20 |
|  | T 4 | 17 | 20 | 20 | 19 | 20 |
| Catalyst C (0.02 g) | T 1 | 20 | 19 | 18 | 19 | 20 |
| Diazabicyclooctane | T 2 | 27 | 27 | 26 | 26 | 27 |
| (0.02 g) | T 3 | 27 | 27 | 26 | 26 | 27 |
|  | T 4 | 27 | 27 | 26 | 26 | 27 |
| Catalyst D (0.02 g) | T 1 | 16 | 16 | 16 | 17 | 17 |
| Diazabicyclooctane | T 2 | 25 | 24 | 22 | 24 | 24 |
| (0.02 g) | T 3 | 25 | 24 | 22 | 24 | 24 |
|  | T 4 | 25 | 24 | 22 | 24 | 24 |

EXAMPLE 2

Production of Semi-Rigid Integral Skin Foam

A-component:
70 g of Polyol C
20 g of Polyol D
1 g of ethylene glycol
14 g of 1,4-butane diol
12 g of trichlorofluoromethane
0.02 g of Catalyst A
0.3 g of triethylenediamine (Dabco ®)
B-component:
74 g of Isocyanate A The constituents of the A-component are combined at room temperature and intensively mixed for 30 seconds using a high-speed stirrer. After the B-component has been added, the two components are intensively mixed for another 10 seconds at room temperature and the resulting mixture foamed in a free-foam packet.

The following reaction times were measured:
$T_1 = 16 \pm 3$ seconds $T_2 = 25 \pm 3$ seconds
$T_3 = 25 \pm 3$ seconds $T_4 = 25 \pm 3$ seconds.

If the mixture of isocyanate and polyol components is introduced into a closed metal mold measuring 20×20×1 cm and tempered to 60° C., the foamed material hardens with an increase in density to form moldings having an integral structure with an impervious compact outer skin.

The foam formed has very fine cells and a smooth surface.

EXAMPLE 3

Production of Semi-Rigid Integral Skin Foam (Using Catalyst According to the Invention, Without Co-Catalyst) (Table 3)

A-component:
90 g of Polyol A
17 g of ethylene glycol
4 g of Polyol D
1 g of carbon black
x g of Catalyst according to the invention
B-component:
95 g of Isocyanate A
5 g of dichloromethane
Foaming ratio: 100 g of A-component/109 g of B-component
Index: 105
Temperature of raw material components: 23° C.

The constituents of the A-component are combined at room temperature and intensively mixed for 30 seconds using a high-speed stirrer. After the B-component—mixed beforehand—has been added in the foaming ratio indicated, the components are mixed for another 10 seconds and the resulting mixture foamed in a 650 ml cardboard cup.

TABLE 2

|  | Example 3.1 | Example 3.2 | Example 3.3 | Example 3.4 | Example 3.5 | Example 3.6 |
|---|---|---|---|---|---|---|
| Catalyst | A | B | C | D | E | F |
| Quantity (g) | 0.10 | 0.15 | 0.20 | 0.20 | 1.10 | 2.00 |
| Cream time (secs. ± 3) | 15 | 15 | 14 | 18 | 18 | 20 |
| Rise time (secs. ± 3) | 20 | 18 | 18 | 23 | 23 | 24 |
| Gel time (secs. ± 3) | 19 | 17 | 16 | 21 | 21 | 23 |
| Density (g/l) | 585 | 508 | 291 | 303 | 470 | 354 |

If the mixture of isocyanate and polyol components is introduced into a closed metal mold measuring 20×20×1 cm and tempered to 60° C., the foamed material hardens with an increase in density to form moldings having an integral structure with an impervious compact outer skin.

EXAMPLE 4

Production of Rigid Integral Skin Foam

A-component:
100 parts by weight of a polyol mixture, having an OH-number of 946 and a viscosity at 25° C. of 4300 mPa.s and consisting of 95 parts, by weight, of a polyether having an OH-number of 900—obtained by the addition of propylene oxide with trimethylol propane——and 5 parts, by weight, of ethylene glycol, 3 parts, by weight of a polysiloxane/polyalkylene oxide block copolymer as foam stabilizer, 1 part by weight, of 1-cyclohexyl-2-methyl tetrahydropyrimidine and the corresponding Sn-catalyst according to the invention as paired catalyst as indicated in table 3 and 10 parts by weight, of monofluoro-trichloromethane as blowing agent.

B-component:
277 parts, by weight, of an aliphatic polyisocyanate obtained by reacting 7.74 moles of a polyol formed from trimethylol propane and propylene oxide (OH-number 378) and 1.47 moles of a polyester formed from castor oil and cyclohexanone formaldehyde condensate (OH-number 165) with 121.9 moles of 1-isocyanato-3,3,5-trimethyl-5-isocyanato-methyl cyclohexane (isophorone diisocyanate), and having a total NCO-content of 28.2% and a viscosity of 120 mPa.s.

The polyol mixture and polyisocyanate are mixed in a two-component metering and mixing unit and the resulting mixture introduced into a closed metal mold tempered to 90° C. in which the mixture foams and hardens with an increase in density. After 5 minutes, the molding is removed from the mold. The molding has a total gross density of 0.6 g/cc, a thickness of 10 mm, and a completely impervious, compact skin.

Table 3 shows the reaction times of the foamable mixture (±3 seconds in each case), the deflection values under heat of the 10 mm thick moldings produced with 0.5 parts of Sn-catalyst, and their surface hardness values.

TABLE 3

|  | Reaction times ($T_1/T_2$) (0.32 part of catalyst) | Reaction times ($T_1/T_4$) (0.5 part of catalyst) | Flexural strength under heat 10* according to DIN 53432 | Surface hardness-Shore D according to DIN 53505 |
|---|---|---|---|---|
| Catalyst A | 13/24 | 11/22 | 109° C. | 75 |
| Catalyst D | 13/26 | 8/11 | 110° C. | 77 |
| Catalyst F | 14/27 | 12/23 | 106° C. | 76 |
| DBTL (Comparison test) |  | 15/30 | 105° C. | 75 |

*The temperature at which the cantilever beam loaded at one end reaches a deflection of 10 mm is measured under a constant bending stress of 0.3 mPa and at a heating rate of 50° K./hour. These data represent short-term values.

The catalysts according to the invention show considerably higher activity than DBTL. In addition, the moldings produced with them show a reduced tendency to develop blisters.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of polyurethanes by reacting polyisocyanates with organic compounds containing at least two isocyanate-reactive hydrogen atoms and having molecular weights of from 400 to 10,000 in the presence of activators, characterized in that the activators used are compounds corresponding to the general formula:

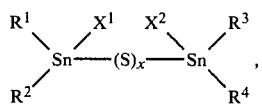

wherein $R^1$, $R^2$, $R^3$ and $R^4$ may be the same or different and may represent $C_1$–$C_{20}$-alkyl, $C_5$–$C_7$-cycloalkyl, $C_6$–$C_{14}$-aryl or $C_7$–$C_{30}$-alkaryl;

$X^1$ and $X^2$ may be the same or different and represent a halogen radical or a radical of the formula —$OR^5$, —$SR^6$ or

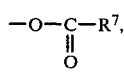

with the proviso that $X^1$ and $X^2$ cannot both represent a halogen atom;

$R^5$, $R^6$ and $R^7$ may be the same or different and represent $C_1$–$C_{20}$-alkyl, $C_5$–$C_7$-cycloalkyl, $C_6$–$C_{14}$-aryl or $C_7$–$C_{30}$-alkaryl; and $1 \leq x \leq 4$.

2. A process according to claim 1, characterized in that the polyisocyanates are reacted with said organic compounds containing at least two isocyanate-reactive hydrogen atoms also in the presence of a catalytic quantity of a metallic or non-metallic co-catalyst.

3. A process according to claim 1, characterized in that the polyisocyanates are reacted with said organic compounds containing at least two isocyanate-reactive hydrogen atoms also in the presence of a catalytic quantity of a metallic or non-metallic co-catalyst, a chain-extending agent having a molecular weight of from 32 to 400, a blowing agent, a cell-stabilizer, and other known auxiliaries and additives.

4. A process according to claim 1, characterized in that, in the general formula, $R^1$ and $R^2$ are the same and $R^3$ and $R^4$ are the same and the halogen radical of the definition of $X^1$ and $X^2$ is a chlorine atom.

5. A process according to claim 1, characterized in that, in the general formula $R^1$, $R^2$, $R^3$ and $R^4$ represent a $C_1$–$C_{12}$-alkyl radical and $R^5$, $R^6$ and $R^7$ represent a $C_1$–$C_{20}$-alkyl radical.

6. A process according to claim 1, characterized in that the activators corresponding to the general formula are used in a quantity of from 0.005 to 1%, by weight, and preferably in a quantity of from 0.01 to 0.5%, by weight, based on the compounds containing at least two active hydrogen atoms and having molecular weights of from 400 to 10,000.

7. A process as claimed in claim 1, characterized in that moldings, having an impervious outer skin, which does not merge suddenly with the foam core, and a foam core having a decreasing density, of which the minimum lies substantially in the middle of the molding-parting cross section, are produced.

8. A storable intermediate product for the production of polyurethanes comprising;

(a) an organic compound containing at least two isocyanate-reactive hydrogen atoms and having a molecular weight of from 400 to 10,000, and (b) a catalytically-active quantity of an activator corresponding to the general formula

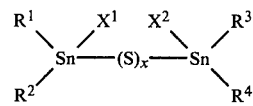

wherein $R^1$, $R^2$, $R^3$ and $R^4$ may be the same or different and may represent $C_1$–$C_{20}$-alkyl, $C_5$–$C_7$-cycloalkyl, $C_6$–$C_{14}$-aryl or $C_7$–$C_{30}$-alkaryl;

$X^1$ and $X^2$ may be the same or different and represents a halogen radical or a radical of the formula —$OR^5$, —$SR^6$ or

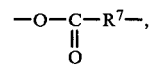

with the provisio that $X^1$ and $X^2$ cannot both represent a halogen atom;

$R^5$, $R^6$ and $R^7$ may be the same or different and represent $C_1$–$C_{20}$-alkyl, $C_5$–$C_7$-cycloalkyl, $C_6$–$C_{14}$-aryl or $C_7$–$C_{30}$-alkaryl; and $1 \leq x \leq 4$.

9. A storable intermediate product according to claim 8, characterized in that said internal product additionally contains:

(a) a catalytic quantity of a metallic or non-metallic co-catalyst.

10. A storable intermediate product according to claim 9, characterized in that said intermediate product additionally contains:

(a) a chain-extending agent having a molecular weight of from 32 to 400, (b) a blowing agent, (c) a cell stabilizer and, (d) other known auxiliaries and additives.

* * * * *